UNITED STATES PATENT OFFICE.

IVAN F. HARLOW, OF MIDLAND, MICHIGAN, ASSIGNOR TO THE DOW CHEMICAL COMPANY, OF MIDLAND, MICHIGAN, A CORPORATION OF MICHIGAN.

METHOD OF EXTRACTING POTASSIUM SALTS FROM BITTERNS.

1,422,571.  Specification of Letters Patent.  Patented July 11, 1922.

No Drawing.  Application filed November 27, 1916. Serial No. 133,717.

*To all whom it may concern:*

Be it known that I, IVAN F. HARLOW, a citizen of the United States, and a resident of Midland, county of Midland, and State of Michigan, have invented a new and useful Improvement in Methods of Extracting Potassium Salts from Bitterns, of which the following is a specification, the principle of the invention being herein explained, and the best mode in which I have contemplated applying that principle, so as to distinguish it from other inventions.

The present method or process has more particular regard to the extraction or recovery of potassium salts from natural alkali plains liquor, although, obviously, such method or process is equally adaptable to the treatment of any similar solution, or "bittern", whether thus occurring naturally or artificially produced. In the liquor in question, the potassium salts consist of carbonates, sulphates, and chlorides, and there are of course present, corresponding salts of other metals, and particularly of sodium, in smaller quantities. I have found that these potassium salts will not precipitate separately, if the liquor be boiled down in its natural state. The object of the present invention, accordingly, is to provide a mode of treatment whereby such naturally occurring potassium salts may be converted into a form which will permit of their concentration and precipitation, and thus of the separation of these valuable constituents from the other, which are of lesser, or no value at all.

To the accomplishment of the foregoing and related ends, the invention, then, consists of the steps hereinafter described and particularly pointed out in the claim, the following description setting forth in detail one approved method of carrying out the invention, such disclosed mode, however, constituting but one of the various ways in which the principle of the invention may be used.

By my present improved process I am enabled to utilize the alkali plains liquor as at present obtainable in manufacturing centers, such liquor having ordinarily a density of 33° Bé., being evaporated close to or beyond the point of saturation, in order to reduce the bulk for transportation, so that crystals are frequently found deposited in quantity. To this solution, I add calcium chloride in an amount approximately chemically equivalent to the potassium present, and then heat the mixture to 95° C., that is practically to boiling. Under these conditions a dense precipitate of calcium carbonate will form, as indicated by the following equation, referring specifically to potassium carbonate, viz,

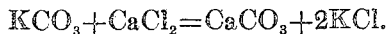
$$KCO_3 + CaCl_2 = CaCO_3 + 2KCl.$$

The potassium chloride of course goes into solution with the sodium salts, so-called, that is the sodium carbonate and sulphate, which are already in such solution. I next filter out the calcium carbonate precipitate, and thereupon concentrate the residual solution to approximately three quarters of its former volume. This will precipitate, or "boil out", most of the aforesaid sodium salts, so that the potassium chloride will accordingly constitute the bulk of the solid matter in the residual solution, the amount of such sodium salts remaining, being small. Upon now cooling such solution to approximately 20° C., I am enabled to crystallize out such potassium chloride, practically pure (90 to 95%).

Instead of using calcium chloride, as described above, for converting the potassium salts into the chloride, I may utilize sodium chloride (NaCl) with equally satisfactory results. The corresponding reaction in such case will be as follows, viz:—

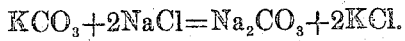
$$KCO_3 + 2NaCl = Na_2CO_3 + 2KCl.$$

The sodium carbonate, in contradistinction to the calcium carbonate produced by the previous reaction, is of course soluble, and a corresponding addition is made to the content of "soda salts" in the solution, but all of such "soda salts" will be boiled out upon concentrating the solution as before to approximately three quarters of its former volume. Upon then cooling the residual solution as before to approximately 20° C., the potassium chloride will in turn crystallize out. The process just described in effect is simpler than the first one, in that no precipitate is formed incidentally to the conversion of the potassium salts into the chloride form, and consequently no filtration of the solution is required, but after being subjected to the treatment in question such solution may at once be boiled down.

In either of the foregoing modifications of my process no particularly difficult or involved steps are involved, yet effect the complete separation of the potassium salts and in an unusually high state of purity.

Other modes of applying the principle of my invention may be employed instead of the one explained, change being made as regards the steps herein disclosed, provided the steps stated by the following claim or the equivalent of such stated steps be employed.

I therefore particularly point out and distinctly claim as my invention:—

The method of recovering potassium salts from a bittern containing potassium carbonate among other potassium salts and also containing sodium salts, such bittern being concentrated approximately to the point of saturation, which consists in adding calcium chloride thereto in an amount chemically equivalent to the potassium present; heating the solution to approximately 95 degrees C., whereby calcium carbonate is precipitated out, leaving the potassium in solution in the form of the chloride; further heating the residual solution so as to concentrate the same to approximately three-fourths of its former volume, whereupon the sodium salts crystallize out of such solution while still hot; separating such crystallized salts from the mother liquor; and then cooling such liquor to approximately 20 degrees C., whereupon the potassium chloride will crystallize out practically pure.

Signed by me, this 24 day of Nov., 1916.

IVAN F. HARLOW.